(12) United States Patent
Lenz et al.

(10) Patent No.: US 8,084,392 B2
(45) Date of Patent: Dec. 27, 2011

(54) CRYSTALLINE SILICA-FREE DIATOMACEOUS EARTH FILTER AIDS AND METHODS OF MANUFACTURING THE SAME

(75) Inventors: Peter E. Lenz, Reno, NV (US); Michael J Nannini, Sparks, NV (US); James S Shui, Reno, NV (US)

(73) Assignee: EP Minerals, LLC, Reno, NV (US)

( * ) Notice: Subject to any disclaimer, the term of this patent is extended or adjusted under 35 U.S.C. 154(b) by 574 days.

(21) Appl. No.: 12/167,836

(22) Filed: Jul. 3, 2008

(65) Prior Publication Data
US 2009/0011240 A1 Jan. 8, 2009

Related U.S. Application Data

(60) Provisional application No. 60/948,372, filed on Jul. 6, 2007.

(51) Int. Cl.
*B01J 20/14* (2006.01)
*C01B 33/12* (2006.01)

(52) U.S. Cl. ........ 502/412; 423/335; 423/336; 423/337; 423/338; 423/339; 423/340

(58) Field of Classification Search ............... 502/412; 423/335–340
See application file for complete search history.

(56) References Cited

U.S. PATENT DOCUMENTS

| | | | |
|---|---|---|---|
| 1,985,526 A | 12/1934 | McKinley | |
| 4,325,844 A | 4/1982 | Olmsted, Jr. | |
| 5,179,062 A | 1/1993 | Dufour | |
| 5,656,568 A * | 8/1997 | Shiuh et al. | 502/412 |
| 5,710,090 A | 1/1998 | Dufour | |

FOREIGN PATENT DOCUMENTS

| | | |
|---|---|---|
| EP | 0 758 560 A | 2/1997 |
| EP | 0 790 070 A | 8/1997 |

OTHER PUBLICATIONS

"Material Safety Data Sheet Celite 503 MSDS", [http://www.sciencelab.com/msds.php?msdsId=9927662], as accessed on Aug. 25, 2011.*
Beaver Chemicals, Inc., "Diatomite", [http://www.filteraid.com/diatomite.html], as accessed on Aug. 26, 2011.*
International Preliminary Report on Patentability for PCT/US2008/069270, dated Oct. 26, 2009.

(Continued)

*Primary Examiner* — Stanley Silverman
*Assistant Examiner* — Diana J Liao
(74) *Attorney, Agent, or Firm* — Miller, Matthias & Hull LLP

(57) ABSTRACT

A method of producing a range of diatomaceous earth filter aids having selectable permeabilities and less than about 1 percent by weight total crystalline silica. The method includes milling diatomaceous earth ore to a size range of between about 100 micrometers and about 1400 micrometers; calcining the milled diatomaceous earth in a calciner; and milling the calcined diatomaceous earth in an adjustable milling and classification system to produce diatomaceous earth filter aids. Systems to implement such methods and compositions produced by such methods are also described.

5 Claims, 2 Drawing Sheets

OTHER PUBLICATIONS

Initial Publication with International Search Report for PCT/US2008/069270, dated Jan. 15, 2009.
Database WPI Week 200478, Thomson Scientific, London, GB; AN 2004-792549; XP002502815 & RU 2 237 510 C1 (Non-Ore Minerals Geology Res Inst) Oct. 10, 2004.

Australian office action on application No. 2008275241 issued on Aug. 25, 2010.
Australian office action on application No. 2008275241 issued on May 25, 2011.

* cited by examiner

CRYSTALLINE SILICA-FREE DIATOMACEOUS EARTH FILTER AIDS AND METHODS OF MANUFACTURING THE SAME

CROSS REFERENCE TO RELATED APPLICATIONS

The present application claims the benefit of and priority to U.S. Provisional Patent Application No. 60/948,372, filed Jul. 6, 2007, entitled "CRYSTALLINE SILICA-FREE DIATOMACEOUS EARTH FILTER AIDS AND METHODS OF MANUFACTURING THE SAME", which application is hereby incorporated by reference in its entirety for all purposes.

FIELD OF INVENTION

The present invention relates to diatomaceous earth filter aids and methods and systems for producing the same. More specifically, the present invention relates to diatomaceous earth filter aids containing less than about 1 percent by weight total crystalline silica. The diatomaceous earth filter aids of the present invention may have a permeability ranging from about 0.01 darcy to about 20 darcy.

BACKGROUND OF THE INVENTION

Diatomaceous earth has been used for many years in a number of applications utilizing its absorptive properties and its filtration properties, among other applications. Diatomaceous earth ore is a naturally occurring ore that is fairly easily crushed or crumbled into a fine powder. Diatomaceous earth consists primarily of the skeletal remains of diatoms, which is a type of algae, and includes primarily silica, along with some minor amounts of sodium, magnesium, and iron. The percentages of the various elements may vary depending on the source or collection point of the diatomaceous earth, but generally the silica (in an amorphous form) constitutes over 85% by weight of the diatomaceous earth.

Diatomaceous earth has been used for many years as a filter aid due to its high porosity and because its porosity can be adjusted by modifying the particle size of the final diatomaceous earth product. Conventional processes used to produce diatomaceous earth filter aids typically begin with a crushing and milling step in which the diatomaceous earth ore is milled in an open circuit to a median particle size of between 10 and 20 micrometers. The milled ore is then sent to a calciner where the ore is heated to temperatures greater than about 1000° C. In the past, the calcining step has been done both with and without the addition of a fluxing agent. In conventional processes, the discharge of the calciner is typically refined or milled to attain the desired final particle size prior to packaging.

In conventional processes, some of the amorphous silica of the diatom frustules is converted to crystalline silica in the form of cristobalite. Crystalline silica is considered to be a health risk by many, especially in a respirable form (i.e., particle size smaller than 10 micrometers). Diatomaceous earth filter aids produced through conventional methods contain greater than 1% by weight crystalline silica and generally contain 50-75% by weight crystalline silica. There has been an industry focus on efforts to reduce the amount of crystalline silica in diatomaceous earth filter aids and particularly the respirable particles of crystalline silica. Unfortunately, these efforts heretofore have not been successful at developing a method capable of producing filter aids with a diversity of permeabilities.

It is known that the conversion from amorphous silica to crystalline silica occurs at high temperatures, whether flux is added or not, and that the conversion is accelerated when a sodium-based flux is added. Accordingly, efforts to reduce crystalline silica formation have included attempts to calcine without a fluxing agent, to calcine with a non-sodium based flux, to reduce the time the diatomaceous earth is exposed to high heat in the calciner (so called "flash calcining"), to eliminate the calcining step altogether, or some combination of the above. However, to produce diatomaceous earth filter aids having a range of permeabilities (i.e., ranging from 0.01 darcy to greater than 10 darcy, including for example 20 darcy or 30 darcy), a variety of processes would be implemented to produce the various filter aids.

For example, diatomaceous earth filter aids produced without calcining have a restricted permeability range between 0.01 darcy and 0.10 darcy. The addition of heat, such as in a conventional calcining step, causes some sintering of the diatoms, drives off the water of hydration, reduces the specific surface area of the particles, and results in filter aids with permeabilities between 0.05 darcy and 1.0 darcy, but also produces some crystalline silica. In order to obtain still higher permeabilities (i.e., greater than 1.0 darcy), flux is added prior to the calcining step to form a vitreous phase during calcining that agglomerates the individual diatoms and diatom pieces to form much coarser particles. Diatomaceous earth filter aids made using a flux can have permeabilities of between 0.4 darcy and 30 darcy.

Depending on the permeability level desired and the level of crystalline silica tolerable in the final product, conventional diatomaceous earth manufacturers would run one of the above processes, sometimes being limited in permeability ranges by the tolerable crystalline silica. Accordingly, a single manufacturing process capable of producing a complete range (high and low permeability) of diatomaceous earth filter aids having less than 1% by weight crystalline silica has not been available.

At least two prior attempts to provide such a manufacturing process have been unsuccessful for different reasons. One such attempt was a flash calcine process where the diatomaceous earth was calcined by reducing the residence time of the diatomaceous earth in the hot zone of the calciner. As the formation of crystalline silica is time and temperature dependent, the theory was that by reducing the residence time the formation of cristobalite could be avoided even when a flux was used. However, no one has yet been able to make this concept economically viable on a commercial scale. Another such attempt included using an alternative fluxing agent, such as substituting a potassium-based flux for the sodium-based flux. While potassium-based fluxing agents have been successfully used to produce diatomaceous earth filter aids, it has not been shown to be able to produce medium or high permeability filter aids.

The present invention provides methods capable of producing diatomaceous earth filter aids having a large range of permeabilities and having less than 1% by weight crystalline silica. Additionally, the present invention provides diatomaceous earth filter aids having less than 1% by weight crystalline silica and having permeabilities greater than 1.0 darcy, which were heretofore unattainable.

SUMMARY OF THE INVENTION

The present invention is directed to methods of producing diatomaceous earth filter aids. The methods include milling diatomaceous earth ore to a size range of between about 100 micrometers and about 1400 micrometers and calcining the milled diatomaceous earth in a calciner adapted to provide uniform heating. The calcined diatomaceous earth is then further milled in an adjustable milling and classification system to produce diatomaceous earth filter aids having a selectable particle size distribution. The resulting diatomaceous filter aids have selectable permeabilities ranging from about 0.01 darcy to about 20 darcy, or even 30 darcy. In some implementations, the methods include classifying the milled diatomaceous earth ore prior to calcining to remove any diatomaceous earth ore smaller than about 100 micrometers. The diatomaceous earth ore smaller than about 100 micrometers may be directed to a conventional diatomaceous earth filter aid process.

The methods may be adapted to limit the production of crystalline silica. For example, the calciner may be adapted to maintain an internal temperature between about 900° C. and about 980° C. The milled diatomaceous earth may be allowed to remain in the hot zone of the calciner for between about 10 minutes and about 60 minutes. The methods of the present invention may configure the calcining step to maintain the milled diatomaceous earth in a hot zone for a time and at a temperature adapted to harden the diatomaceous earth without forming cristobalite.

The present invention is also directed to diatomaceous earth filter aids made by one or more of the methods described herein. For example, diatomaceous earth filter aids comprising milled and calcined diatomaceous earth that was milled to a size range of between about 100 micrometers and about 1400 micrometers prior to calcining and that was calcined at a temperature between about 900° C. and about 980° C. As another non-limiting example, the present invention is also directed to diatomaceous earth filter aids comprising calcined and milled diatomaceous earth comprising less than about 1.0 wt % total crystalline silica and having a permeability ranging between about 1.5 darcy to greater than about 10 darcy.

Other aspects and features of the present invention will become more apparent with reference to the following detailed description and the accompanying figure(s). While the above is a summary of several aspects of the present invention, it is a summary and is not limiting. For example, other features and aspects not described above but described in more detail below are within the scope of the present invention.

DETAILED DESCRIPTION

Figure 1:
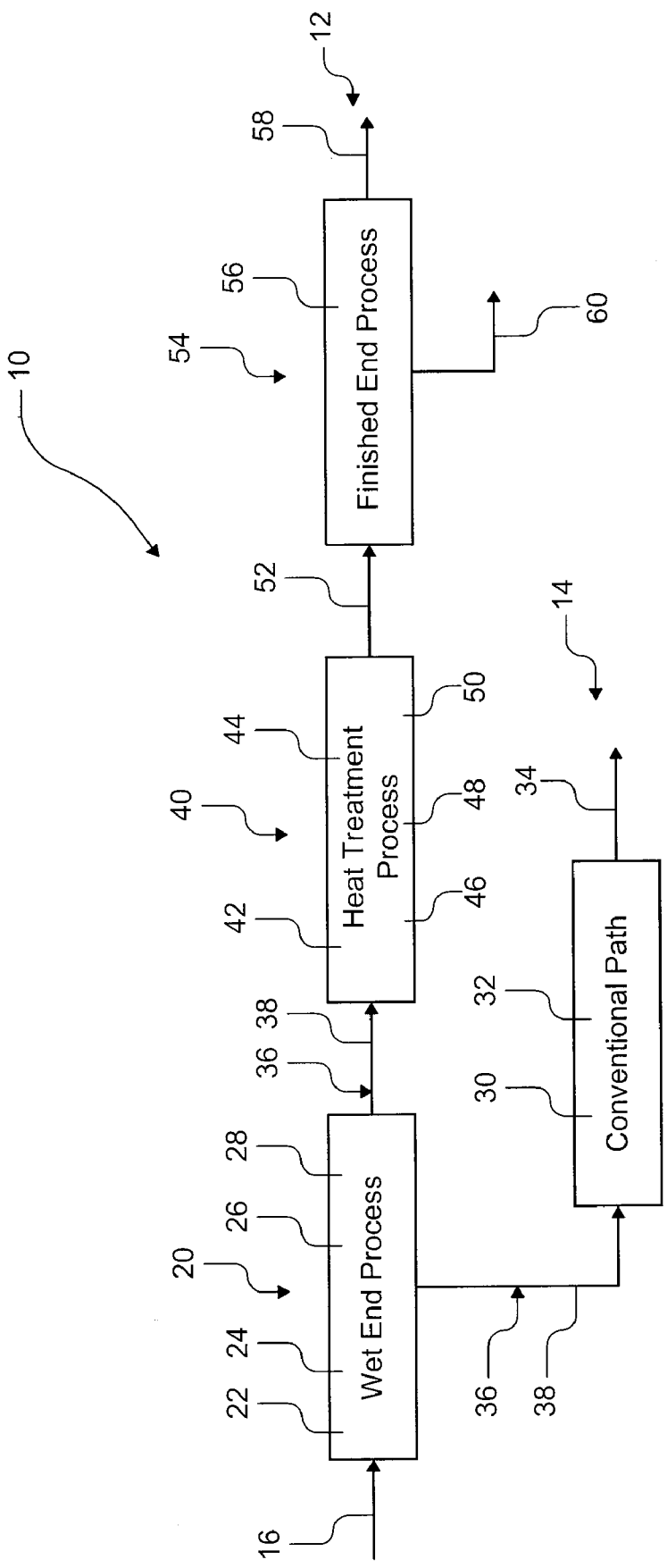
FIG. 1 is a schematic flow chart of various aspects of a method of manufacturing diatomaceous earth filter aids according to various embodiments of the present invention.

FIG. 1 illustrates schematically a representative method of manufacturing diatomaceous earth filter aids according to various embodiments of the present invention. Generally, FIG. 1 illustrates a diatomaceous earth (DE) filter aid manufacturing process 10, also referred to as the DE process 10, including a crystalline silica-free path 12 (CS-free path 12) and a conventional path 14. As illustrated and as will be understood from the description below, the conventional path 14 is optional.

Diatomaceous earth ore 16 is fed to a wet end process 20. One or more processes may occur in the wet end process 20, such as crushing processes 22, milling processes 24, drying processes 26, and/or classification processes 28. The diatomaceous earth ore 16 is processed in the wet end process 20 to a particle size range between about 100 micrometers and about 1400 micrometers. Depending on the particle size of the feed ore 16, the wet end process 20 may include at least one crushing apparatus adapted to reduce the diatomaceous earth ore to a size suitable for milling. Additionally or alternatively, the ore 16 may be milled without being crushed in the wet end process 20. The milled diatomaceous earth may pass through a classification process 28 adapted to screen out particles smaller than 100 micrometers and larger than 1400 micrometers. The milled diatomaceous earth may also be dried through a drying process 26. The drying process 26 may occur before, during, or after the classification process.

Figure 2:
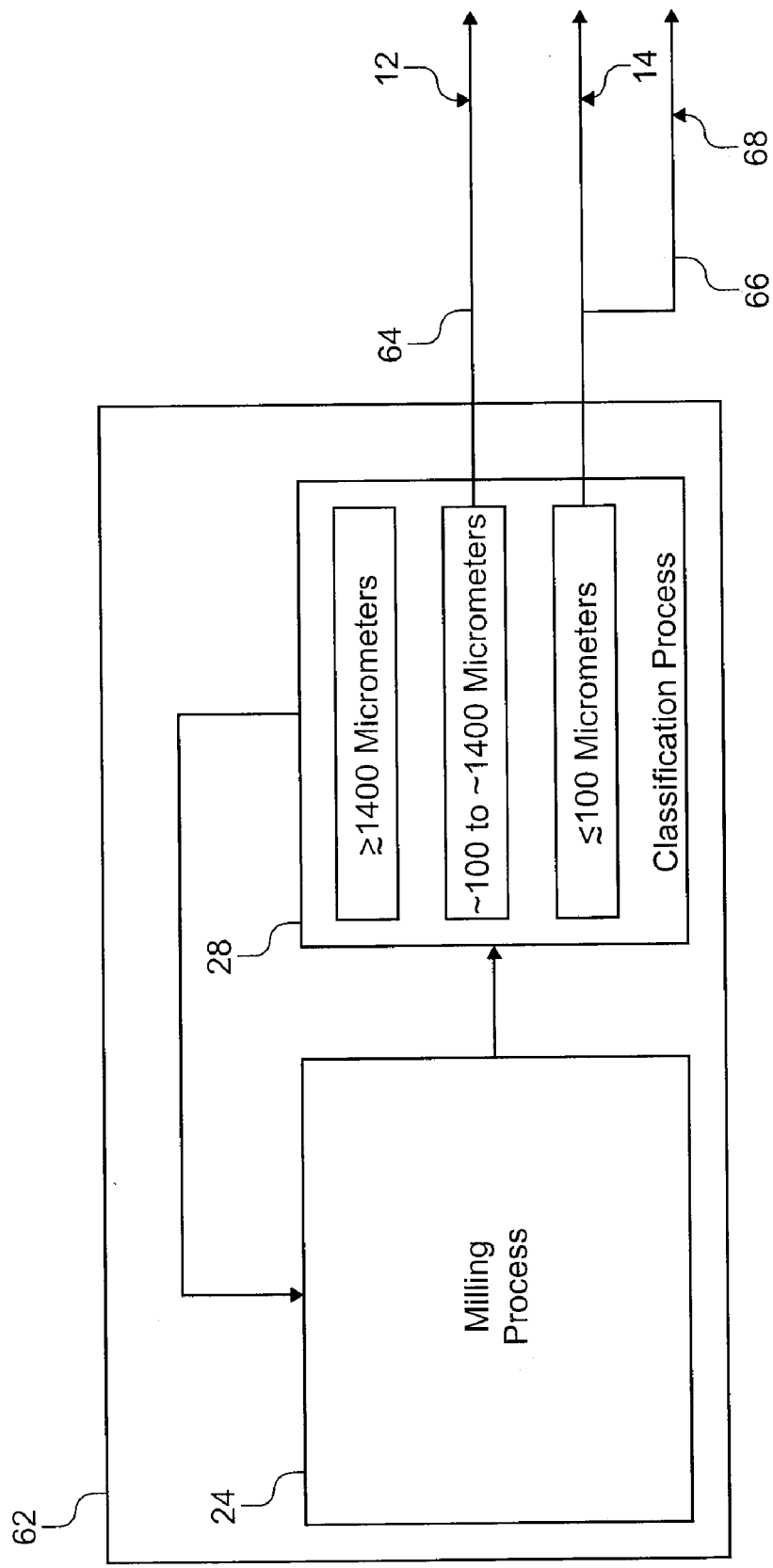
FIG. 2 is a schematic partial flow chart of one embodiment of the method illustrated in FIG. 1, particularly showing the closed circuit loop integrating the milling and classification processes.

Referring simultaneously to FIG. 1 and FIG. 2, the milling process 24 and the classification process 28 may be configured in a closed-circuit loop 62 adapted to cycle larger particles (i.e., particles larger than about 1400 micrometers) back to the milling process 24 from the classification process 28 and to allow particles between about 100 micrometers and about 1400 micrometers to pass through to the subsequent processing steps 64 of either the CS-free path 12 or the conventional path 14. The steps and processes within the wet end process 20 may be ordered or configured in any suitable manner to produce a milled stream 36 of milled diatomaceous earth ore 38 for further processing.

Additionally, and with continued reference to both FIG. 1 and FIG. 2, the wet end process 20 may be configured to remove 66 particles of diatomaceous earth that are smaller than 100 micrometers so the smaller particles do not proceed through the CS-free path. The diatomaceous earth particles smaller than about 100 micrometers generated in the wet end process 20 may be directed to a waste stream 68 or may be directed to a conventional diatomaceous earth processing path 14. The conventional diatomaceous earth processing path 14 may include a conventional calciner 30 and any number of other conventional apparatus 32 adapted to produce a conventional diatomaceous earth filter aid 34, such as filter aids containing substantial and/or significant quantities of crystalline silica.

Referring now primarily to FIG. 1 and continuing with the discussion of the CS-free path 12, the milled diatomaceous earth ore 38 is fed from the wet end process 20 to a heat treatment process 40 adapted to calcine the dried and sized diatomaceous earth ore. The heat treatment process 40 may include a calciner 42 adapted for low temperature calcination. The calciner 42 may include any suitable calciner now known or hereinafter developed, including, but not limited to, a directly or indirectly fired rotary kiln or a fluid bed calciner. The calciner 42 selected for use may preferably be adapted to provide uniform heating within the hot zone 44 of the heat treatment process 40. The hot zone 44 of the heat treatment process 40 may include any region and/or period of the heat treatment process, including the calciner 42, where and/or when the diatomaceous earth ore 38 is exposed to elevated temperatures.

The heat treatment process 40 may include a variety of other processes and/or apparatus adapted to support the calcining of the diatomaceous earth ore 38. For example, belts or other transport systems 46 may be included to move the diatomaceous earth ore 38 through the hot zone. Additionally, apparatus adapted to provide the heat and other elements of a suitable calcining environment may be included in the heat treatment process, such as heaters 48 and oxygen supply apparatus 50. The calcining temperature (i.e., the temperature in the hot zone 44) may be maintained below about 1000° C. In some implementations, temperature control elements may be incorporated into the heat treatment process 40 to maintain the calcining temperature below about 980° C. Effective calcining requires the hot zone 44 to be maintained above a minimum temperature, which may be above about 850° C. In some implementations, temperature control elements may be adapted to maintain the calcining temperature between about 900° C. and about 980° C.

Depending on the temperature of the hot zone 44, the size of the diatomaceous earth particles, the oxygen concentration in the hot zone, among other factors, the heat treatment process 40 may be adapted to move the milled diatomaceous earth ore 38 through the hot zone 44 at different rates. For example, the belts or other transport systems 46 configured to move the diatomaceous earth ore 38 through the hot zone may be adapted to provide a hot zone residence time of between about 10 minutes and about 60 minutes. The shorter residence times may be suitable for higher temperature hot zones.

Other than heat and excess oxygen, no other supplemental elements are applied in the heat treatment process 40. More specifically, no fluxing agent is required by the present DE process 10 to produce diatomaceous earth filter aids having a full range of permeabilities (e.g., including permeabilities greater than 1.5 darcy). In addition to the heat provided in the calciner 42, the heat treatment process 40 may include oxygen supply apparatus 50 adapted to maintain the presence of excess oxygen (i.e., oxygen beyond what is needed for combustion) in the calciner. The excess oxygen may be at least 10% and, in some embodiments, may be about 20% greater than the total amount of oxygen needed for combustion.

The heat treatment processes 40 may be conducted at low temperatures compared to the conventional methods of producing DE filter aids. The lower temperatures of the heat treatment processes 40 of the present invention serves only to remove water of hydration and low levels of organic content from the milled diatomaceous earth ore 38, to slightly harden the individual particles of diatomaceous earth, and to oxidize any metals, such as iron, that may be present in the ore. Because the milled diatomaceous earth ore 38 fed to the heat treatment process is more coarse than in conventional processes, high temperatures and flux are not needed to sinter or agglomerate the diatomaceous earth particles. Accordingly, the formation of cristobalite is reduced if not eliminated. Conventional diatomaceous earth filter aid processes relied upon the calcination conditions to determine the particle size of the filter aids (i.e., temperatures, flux, and residence times being controlled to produce larger or smaller agglomerated particles) and the resulting permeabilities, which enabled a full range of permeabilities including permeabilities between 10 and 30 darcy. The present systems and methods control permeabilities and particles size distribution by controlling the milling and classification of the diatomaceous earth ore feed 16 and the calcination discharge 52.

The calcination discharge 52 is then treated in a finish end process 54. The finish end process 54 may, for example, include a wet and/or dry process, and may include an adjustable, closed circuit milling and classification system 56. The milling and classification system 56 may include any suitable combination of screens, mechanical classifiers, cyclones, impact mills, media mills, hydrocyclones, filters, etc. adapted to further mill the calcination discharge 52 into a finished diatomaceous earth filter aid 58. The milling and classification system 56 may include one or more adjustable elements to allow the finish end process to produce any desired final particle size distribution to accomplish a full range of permeabilities. For example, the finish end process 54 may be configured to produce diatomaceous earth filter aids having a permeability of about 5 darcy during one period of time, then reconfigured through adjustment of the milling and classification system 56 to produce diatomaceous earth filter aids having a permeability of about 10 darcy during a second period of time. Through control of the wet end process 20 and the finish end process 54, it is possible to develop various filter aids having permeabilities ranging from about 0.01 darcy to about 20 darcy.

The finish end process 54 may also include at least one apparatus adapted to collect and remove fines and trap waste, which may be directed away from the CS-free path 12 via waste stream 60. Depending on the composition of waste stream 60, one or more physical streams may exit the finish end process to separate the materials and/or one or more of the waste streams 60 may undergo further processing and/or separation steps to enable the discharge to be utilized. The removal of baghouse fines may assist in reducing the amount of respirable crystalline silica from the final diatomaceous earth filter aids. For example, it may be desirable for the respirable crystalline silica to be less than about 0.1% by weight of the final diatomaceous earth filter aid composition.

The foregoing discussion illustrates exemplary methods within the scope of the present invention. Additionally, the foregoing discussion includes exemplary apparatus and systems that may be utilized in implementing the methods of the present invention. Diatomaceous earth filter aid processing systems adapted to implement the methods described above, such as those described in connection with the methods described above, are within the scope of the present invention. Similarly, diatomaceous earth filter aids produced according to the methods of the present disclosure are within the scope of the present invention. For example, diatomaceous earth filter aids having less than about 1 percent by weight crystalline silica and permeabilities greater than about 1.5 darcy are within the scope of the present disclosure and invention.

It is believed that the disclosure set forth above encompasses multiple distinct methods, apparatus, and/or compositions with independent utility. While each of these methods and apparatus has been disclosed in its preferred form, the specific embodiments thereof as disclosed and illustrated herein are not to be considered in a limiting sense as numerous variations are possible. The subject matter of the disclosures includes all novel and non-obvious combinations and sub-combinations of the various elements, features, functions and/or properties disclosed herein. The principles of the present disclosure may be embodied in other specific forms without departing from its structures, methods, or other essential characteristics as broadly described herein. The described embodiments are to be considered in all respects only as illustrative, and not restrictive. The scope of the invention is, therefore, not limited by the foregoing description or the following claims, and all changes that come within the meaning and range of equivalency of the foregoing description and/or the following claims are to be embraced within its scope. Similarly, where the description and/or the claims recite "a" or "a first" element or the equivalent thereof, such description should be understood to include incorporation of one or more such elements, neither requiring nor excluding two or more such elements.

It is believed that the following claims are directed to certain combinations and sub-combinations that correspond to disclosed examples and that are believed to be novel and non-obvious. Other combinations and sub-combinations of features, functions, elements and/or properties may be claimed through amendment of the present claims or presentation of new claims in this or a related application. Such amended or new claims, whether they are directed to a different combination or directed to the same combination, whether different, broader, narrower or equal in scope to the original claims, are also regarded as included within the subject matter of the present invention.

The invention claimed is:

1. A diatomaceous earth filter aid, comprising calcined and milled diatomaceous earth comprising less than about 1 percent by weight total crystalline silica, the diatomaceous earth having a permeability ranging from about 1.5 darcy to greater than about 10 darcy.

2. The diatomaceous earth filter aids of claim 1, wherein the diatomaceous earth comprises less than about 0.1% by weight respirable crystalline silica.

3. Diatomaceous earth filter aids made by milling diatomaceous earth ore to a size range of between about 100 micrometers and about 1400 micrometers; calcining the milled diatomaceous earth; and milling the calcined diatomaceous earth in an adjustable milling and classification system to produce diatomaceous earth filter aids having a selectable particle size distribution, wherein the diatomaceous earth has selectable permeabilities ranging from about 1.5 darcy to greater than about 10 darcy.

4. Diatomaceous earth filter aids comprising milled and calcined diatomaceous earth that was milled to a size range of between about 100 micrometers and about 1400 micrometers prior to calcining and that was calcined at a temperature between about 900° C. and about 980° C., the diatomaceous earth having a permeability ranging from about 1.5 darcy to greater than about 10 darcy.

5. The diatomaceous earth filter aids of claim 4, wherein the calcined diatomaceous earth is further milled following calcining to produce diatomaceous earth filter aids having a selectable particle size distribution.

* * * * *